(12) United States Patent
An et al.

(10) Patent No.: US 10,315,546 B2
(45) Date of Patent: Jun. 11, 2019

(54) HEADREST RECLINING MODULE

(71) Applicant: HYUNDAI DYMOS INCORPORATED, Seosan-si Chungcheongnam-do (KR)

(72) Inventors: Sung Chol An, Hwaseong-si (KR); Jin Ho Seo, Yongin-si (KR); Jun Kyu Kim, Hwaseong-si (KR); Chan Uk Park, Gyeongju-si (KR); Myeong Sub Kim, Seongnam-si (KR); Yun Ho Kim, Osan-si (KR); Dong Hwan Kim, Hwaseong-si (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 25 days.

(21) Appl. No.: 15/319,865

(22) PCT Filed: Jun. 29, 2015

(86) PCT No.: PCT/KR2015/006620
§ 371 (c)(1),
(2) Date: Dec. 19, 2016

(87) PCT Pub. No.: WO2016/003129
PCT Pub. Date: Jan. 7, 2016

(65) Prior Publication Data
US 2017/0136925 A1 May 18, 2017

(30) Foreign Application Priority Data
Jul. 1, 2014 (KR) .................. 10-2014-0081705

(51) Int. Cl.
*B60N 2/48* (2006.01)
*A47C 7/38* (2006.01)
(Continued)

(52) U.S. Cl.
CPC .................. *B60N 2/85* (2018.02); *A47C 7/38* (2013.01); *B60N 2/853* (2018.02); *B60N 2/865* (2018.02)

(58) Field of Classification Search
None
See application file for complete search history.

(56) References Cited

U.S. PATENT DOCUMENTS 2,886,097 A * 5/1959 Katz .................. A47C 7/38
297/112
4,657,304 A * 4/1987 Heesch .................. B60N 2/865
297/391
(Continued)

FOREIGN PATENT DOCUMENTS

JP 2011-025782 A 2/2011
KR 10-1998-0037478 8/1998
(Continued)

OTHER PUBLICATIONS

International Search Report, PCT/KR2015/006620, filed Jun. 29, 2015, search dated Sep. 18, 2015, 3pp.
(Continued)

*Primary Examiner* — Kyle J. Walraed-Sullivan
(74) *Attorney, Agent, or Firm* — Brinks Gilson & Lione

(57) ABSTRACT

The preset disclosure provides a headrest reclining module that is mounted on a headrest. The headrest reclining module includes: a base supported on the headrest; a movable bracket coupled to the base to move forward with respect to the base; a head support panel having an end coupled to the movable bracket to be tiltable forward; and a link which has first and second ends respectively coupled to the base and the head support panel such that the first end of the link slides along a predetermined path set in the base or the head (Continued)

support panel and guides the head support panel to be tilted when the movable bracket is moved.

6 Claims, 2 Drawing Sheets

(51) Int. Cl.
  *B60N 2/85* (2018.01)
  *B60N 2/853* (2018.01)
  *B60N 2/865* (2018.01)

(56) References Cited

U.S. PATENT DOCUMENTS

| | | | | |
|---|---|---|---|---|
| 4,720,146 A * | 1/1988 | Mawbey | B60N 2/914 | 297/409 |
| 7,350,859 B2 * | 4/2008 | Klukowski | B60N 2/888 | 297/216.12 |
| 7,517,015 B2 * | 4/2009 | Terada | B60N 2/888 | 297/216.12 |
| 7,611,196 B2 * | 11/2009 | Terada | B60N 2/888 | 297/216.12 |
| 8,103,415 B2 * | 1/2012 | Sakai | B60N 2/0276 | 701/49 |
| 8,833,851 B2 * | 9/2014 | Corral Rodriguez | B60N 2/888 | 297/216.12 |
| 9,789,794 B1 * | 10/2017 | Roychoudhury | B60N 2/4228 | |
| 2001/0026090 A1 * | 10/2001 | Bartels | B60N 2/885 | 297/391 |
| 2002/0043858 A1 * | 4/2002 | Svantesson | B60N 2/865 | 297/391 |
| 2002/0043860 A1 * | 4/2002 | Dinkel | B60N 2/809 | 297/410 |
| 2003/0057758 A1 * | 3/2003 | Baumann | B60N 2/865 | 297/391 |
| 2004/0021358 A1 * | 2/2004 | Gramss | B60N 2/865 | 297/407 |
| 2004/0217641 A1 * | 11/2004 | Lampke | B60N 2/838 | 297/408 |
| 2004/0262974 A1 * | 12/2004 | Terada | B60N 2/865 | 297/407 |
| 2005/0127726 A1 * | 6/2005 | Schilling | B60N 2/888 | 297/216.12 |
| 2005/0168020 A1 * | 8/2005 | Yetukuri | B60N 2/4838 | 297/216.12 |
| 2005/0280304 A1 * | 12/2005 | Akaike | B60N 2/0232 | 297/391 |
| 2006/0071518 A1 * | 4/2006 | Hippel | B60N 2/853 | 297/216.12 |
| 2006/0175881 A1 * | 8/2006 | Akaike | B60N 2/821 | 297/216.12 |
| 2006/0279114 A1 * | 12/2006 | Toda | B60N 2/862 | 297/216.12 |
| 2007/0085400 A1 | 4/2007 | Terada et al. | | |
| 2007/0152482 A1 * | 7/2007 | Schilling | B60N 2/888 | 297/216.2 |
| 2007/0241593 A1 * | 10/2007 | Woerner | B60N 2/865 | 297/216.12 |
| 2007/0246989 A1 * | 10/2007 | Brockman | B60N 2/865 | 297/391 |
| 2007/0257528 A1 * | 11/2007 | Akaike | B60N 2/002 | 297/216.12 |
| 2008/0252113 A1 * | 10/2008 | Alexander | B60N 2/832 | 297/216.12 |
| 2008/0315657 A1 * | 12/2008 | Beroth | B60N 2/821 | 297/391 |
| 2009/0045285 A1 * | 2/2009 | Mastrolia | B64D 25/10 | 244/122 AG |
| 2009/0121526 A1 * | 5/2009 | Akaike | B60N 2/002 | 297/216.12 |
| 2009/0146479 A1 * | 6/2009 | Boes | B60N 2/815 | 297/391 |
| 2009/0234544 A1 * | 9/2009 | Humer | B60N 2/4228 | 701/49 |
| 2010/0026061 A1 * | 2/2010 | McFalls | B60N 2/865 | 297/216.12 |
| 2010/0181810 A1 * | 7/2010 | Yasuda | B60N 2/4228 | 297/216.12 |
| 2011/0204686 A1 * | 8/2011 | Lee | B60N 2/4838 | 297/216.12 |
| 2011/0233974 A1 * | 9/2011 | Yamaguchi | B60N 2/0276 | 297/216.12 |
| 2011/0272977 A1 * | 11/2011 | Froese | B60N 2/865 | 297/216.12 |
| 2011/0316318 A1 * | 12/2011 | Yamaguchi | B60N 2/002 | 297/410 |
| 2012/0032487 A1 * | 2/2012 | Yamaguchi | B60N 2/002 | 297/354.1 |
| 2012/0080923 A1 * | 4/2012 | Kunert | B60N 2/815 | 297/391 |
| 2013/0002000 A1 * | 1/2013 | Delling | B60N 2/865 | 297/391 |
| 2013/0093232 A1 * | 4/2013 | Lin | A47C 7/38 | 297/397 |
| 2013/0116893 A1 * | 5/2013 | Yamaguchi | B60N 2/002 | 701/49 |
| 2015/0239378 A1 * | 8/2015 | Ishihara | B60N 2/815 | 297/391 |
| 2015/0251574 A1 * | 9/2015 | Ishihara | B60N 2/862 | 297/391 |
| 2015/0251575 A1 * | 9/2015 | Ishihara | B60N 2/829 | 297/391 |
| 2015/0251577 A1 * | 9/2015 | Ishihara | B60N 2/4228 | 297/216.12 |
| 2015/0258924 A1 * | 9/2015 | Ishihara | B60N 2/4228 | 297/216.12 |
| 2015/0329023 A1 * | 11/2015 | Ishihara | B60N 2/865 | 297/406 |
| 2016/0046218 A1 * | 2/2016 | Worlitz | B60N 2/643 | 297/406 |
| 2016/0129816 A1 * | 5/2016 | Lee | B60N 2/4864 | 297/409 |
| 2017/0127844 A1 * | 5/2017 | Grone | A47C 7/38 | |
| 2017/0174108 A1 * | 6/2017 | An | B60N 2/0232 | |
| 2017/0313217 A1 * | 11/2017 | Line | B60N 2/865 | |
| 2017/0313218 A1 * | 11/2017 | Line | B60N 2/0232 | |
| 2017/0313219 A1 * | 11/2017 | Line | B60N 2/0232 | |
| 2017/0313220 A1 * | 11/2017 | Line | B60N 2/58 | |
| 2018/0001803 A1 * | 1/2018 | Ishihara | B60N 2/862 | |

FOREIGN PATENT DOCUMENTS

| | | |
|---|---|---|
| KR | 20-0417425 Y1 | 5/2006 |
| KR | 10-2008-0049151 A | 6/2008 |
| KR | 10-2012-0008578 A | 2/2012 |
| KR | 10-2014-0071699 A | 6/2014 |

OTHER PUBLICATIONS

Office Action dated Apr. 3, 2018 from the corresponding Chinese Application No. 201580035962.3, 4pages.

* cited by examiner

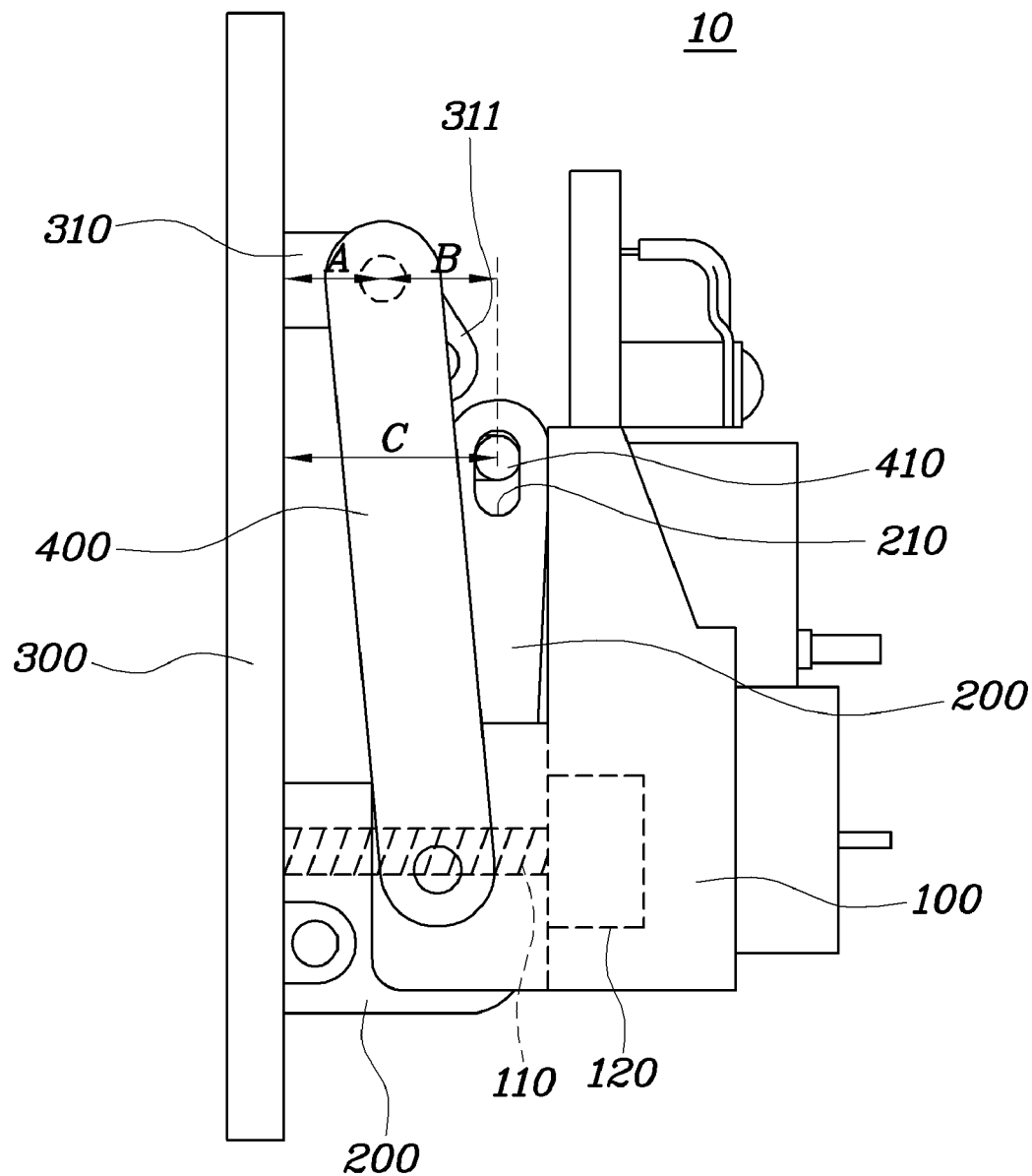
[FIG.1]

[FIG.2]
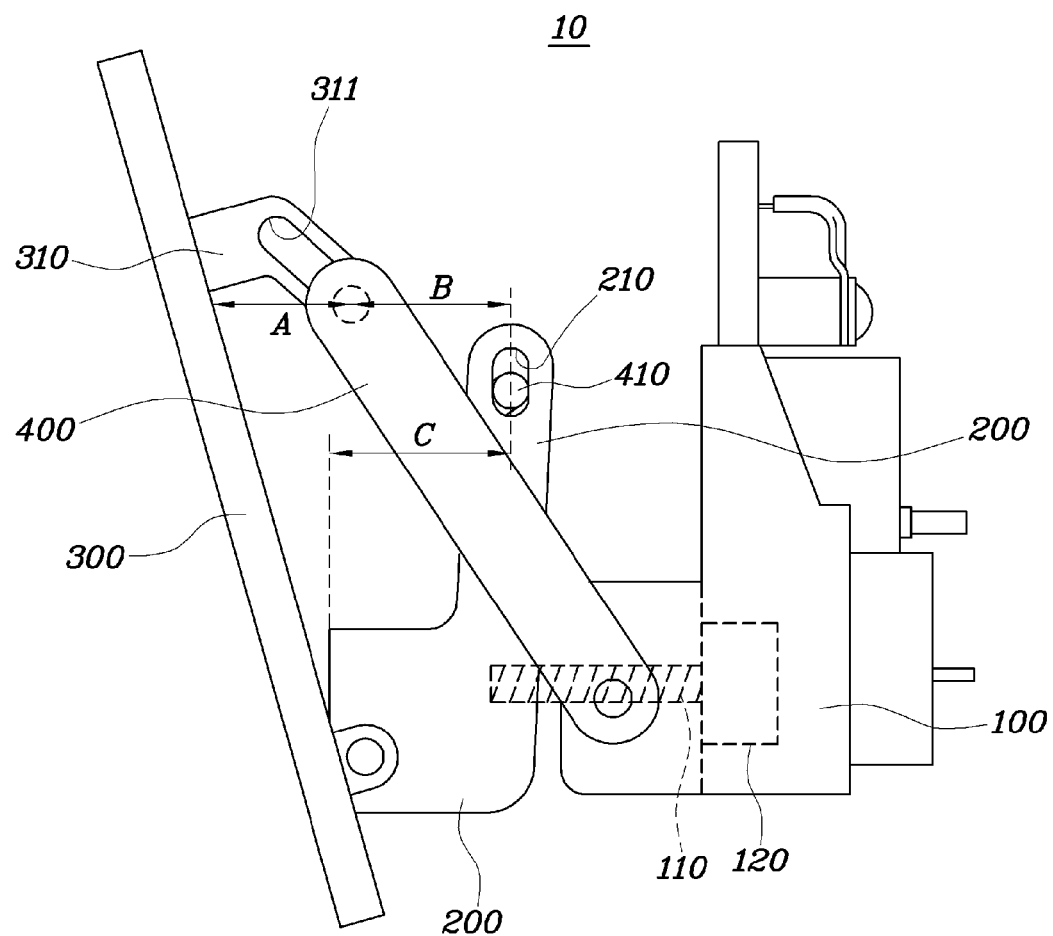

HEADREST RECLINING MODULE

CROSS-REFERENCE TO RELATED APPLICATIONS

This application is a continuation of International Application No. PCT/KR2015/006620, filed on Jun. 29, 2015, which claims priority to and the benefit of Korean Patent Application No. 10-2014-0081705, filed on Jul. 1, 2014, the entirety of each of which are hereby incorporated by reference.

FIELD

The present disclosure relates to a headrest reclining module and, more particularly, to a headrest reclining module having various variable ranges by increasing a reclining angle.

BACKGROUND

The statements in this section merely provide background information related to the present disclosure and may not constitute prior art.

A headrest is mounted upward on a seatback in a vehicle to support and protect the head of a passenger from impact so that the passenger can feel comfort with less fatigue even in long-period driving.

In general, a headrest has a pair of headrest supports to protrude to be inserted through the top of a seatback, and a holder that holds and supports the headrest supports is formed on the top of the seatback so that the headrest can be supported upward on the seatback.

Further, the headrest can be moved up/down by the headrest support supported by the holder so that the position of the headrest can be adjusted to fit to the height of the passenger's head.

On the other hand, according to a "Headrest of a car seat" in KR20-1996-0008998, circular rods are coupled to the upper end of the headrest, and a support plate covering the circular rods and sliding around the circular rods is provided on the headrest has so that the headrest can be moved forward and backward.

However, even according to this headrest, the forward/backward protruding range is extremely limited, and the reclining angle at which the headrest is bent also limited, so it is difficult to adjust the headrest to fit the body structure of a passenger.

The description provided above as a related art of the present disclosure is just for helping understanding the background of the present disclosure and should not be construed as being included in the related art known by those skilled in the art.

SUMMARY

The present disclosure provides a headrest reclining module that provides a large reclining range by making changes of angle in accordance with a movement distance when a headrest moves forward or rearward for reclining of the headrest.

A headrest reclining module according to the present disclosure may include: a base; a movable bracket coupled to the base and configured to move forward and backward with respect to the base; a head support panel having an end coupled to the movable bracket, the head support panel configured to tilt forward; and a link including a first end and a second end, the first and second ends respectively coupled to the base and the head support panel such that the first end is configured to slide along a predetermined path set in the base or the head support panel when the movable bracket is moved. In particular, the first end is configured to guide the head support panel to be tilted.

The headrest reclining module of the present disclosure may further include: a lead screw disposed on the base, protruding forward from the base, and thread-fastened to the movable bracket; and an actuator configured to rotate the lead screw and to move the movable bracket forward and backward with respect to the base.

The head support panel may have a lower end hinged to the movable bracket such that an upper end of the head support panel is configured to rotate and tilt around the lower end.

A panel protrusion that protrudes backward may be formed at the upper end of the head support panel, and a slide slot that defines a predetermined path to which the first end of the link is connected to be slid may be formed in the panel protrusion.

The second end of the link may be rotatably hinged to the lower end of the base.

A coupling protrusion may be formed between the first and second ends of the link to be coupled to the movable bracket, and a guide slot may be longitudinally formed in the movable bracket and configured to guide the coupling protrusion sliding therein.

The slide slot may provide is formed along a lower-rear orthogonal line from the head support panel.

The position of the coupling protrusion on the link may be determined at a point where the sum of a first variable distance and a second variable distance is equal to or greater than a horizontal distance from the coupling protrusion to a rear side of the head support panel. The first variable distance is a horizontal distance from the rear side of the head support panel to the joint point between the first end of the link and the slide slot, and the second variable distance is a horizontal distance from the coupling protrusion to the joint point between the first end of the link and the slide slot.

According to the headrest reclining module having the structure described above, forward/backward movement and reclining are simultaneously made, so reclining is possible within a larger range.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a view showing a headrest reclining module in one form of the present disclosure before it operates; and FIG. 2 is a view showing the headrest reclining module in one form of the present disclosure after it operates.

The drawings described herein are for illustration purposes only and are not intended to limit the scope of the present disclosure in any way.

DETAILED DESCRIPTION

A headrest reclining module according to an exemplary embodiment of the present invention is described hereafter with reference to the accompanying drawings.

FIG. 1 is a view showing a headrest reclining module in one form of the present disclosure before it operates, and FIG. 2 is a view showing the headrest reclining module in one form of the present disclosure after it operates.

A headrest reclining module 10 to be mounted on a headrest includes: a base 100 supported on the headrest; a movable bracket 200 coupled to the base 100 to be movable forward with respect to the base 100; a head support panel 300 having an end coupled to the movable bracket 200 to be tiltable forward; and a link 400 having both ends respectively coupled to the base 100 and the head support panel 300 such that at least one of the ends slides along a predetermined path in the base 100 or the head support panel 300 to allow the head support panel 300 to tilt along a predetermined path when the movable bracket 200 is moved.

In detail, the headrest reclining module 10 is provided in a headrest where the headrest support protrudes downward to be fastened to a seatback. That is, the headrest reclining module 10 is disposed in the headrest such that a headrest front cover that comes in contact with the head of a passenger is positioned ahead of the head support panel 300.

The base 100 may be fixed to an internal frame supporting the headrest in the headrest and the internal frame supporting the headrest may have a back panel coupled to the headrest support. Obviously, the base 100 may be disposed at various positions.

Meanwhile, a lead screw 110 protruding forward from the base 100 and thread-fastened to the movable bracket 200, and an actuator 120 rotating the lead screw 110 to allow the movable bracket 200 to be moved forward may be provided on the base 100.

The actuator 120 may be disposed in the base 100, in which a rotary shaft may be connected to the lead screw 110 through a gear or other coupling members or may be directly connected to the lead screw 110, thereby transmitting power. Alternatively, the rotary shaft may be the lead screw 110 and protrude forward to the base 100.

Further, a first through-hole (not given reference number) through which the lead screw 110 can protrude may be formed in the base 100. The actuator 120 receives an actuating signal from a specific operation switch or a controller and may move the movable bracket 200 forward/backward ahead of the base 100 by rotating the lead screw 110 in accordance with a necessary degree of reclining. Further, a second through-hole (not shown) having a thread on the inner peripheral surface to be thread-fastened to the lead screw 100, allowing the lead screw 110 to be moved with rotation thereof, may be formed in the movable bracket 200.

The head support panel 300 is a panel for supporting the head of a passenger with the front side in contact with the head, and the lower end of the head support panel 300 may be hinged to the movable bracket 200 such that the upper end can rotate around the lower end. Further, the head support panel 300 may be coupled to both sides of the lower end of the movable bracket 200 so that it can rotate only forward and backward and stably support the head of a passenger by uniformly distributing load from the head of the passenger to both sides of the lower end of the movable bracket 200. Since the upper end rotates forward, it can naturally come in surface contact with the head in accordance with the shape of the head, so riding comfort for the passenger is improved.

A panel protrusion 310 that protrudes backward and is coupled to one end of the link 400 is formed at the upper portion of the head support panel 300, and a slide slot 311 that provides a predetermined path through which one end of the link 400 is coupled to be slid may be formed in the panel protrusion 310. A link protrusion (not given reference number) which is inserted in the slide slot 311, allowing to move along the slide slot 311, may be formed at one end of the link 400.

Further, the other end of the link 400 may be rotatably hinged to the lower portion of the base 100.

Further, a coupling protrusion 410 is formed between both ends of the link 400 to be coupled to the movable bracket 200 and a guide slot 210 may be longitudinally formed in the movable bracket 200 at a position corresponding to the coupling protrusion 410, through which the coupling protrusion 410 is slid.

As shown in FIG. 2, when the movable bracket 200 moves forward, the coupling protrusion 410 inserted in the guide slot 210 is moved forward. In this process, since the other end of the link 400 is hinged to the base 100, the link 400 rotates forward and the coupling protrusion 410 is moved down along the guide slot 210 by the rotation of the link. As the link 400 rotates forward, one end of the link 400 slides along the slide slot 311 and presses forward the upper end of the head support panel 300, and accordingly, the head support panel 300 rotates about the lower end, whereby tilting is made.

In order for one end of the link 400 to rotate the head support panel 300 forward when the link 400 is rotated in accordance with forward movement of the movable bracket 200, the sum of a first variable distance "A" that is a horizontal distance from the rear side of the head support panel 300 to the joint point of one end of the link 400 and the slide slot, and a second variable distance "B" that is a horizontal distance from the coupling protrusion 410 to the joint point of one end of the link 400 and the slide slot 411 may be the same as or longer than a reference distance "C" that is a horizontal distance from the coupling protrusion 410 to the front side of the movable bracket 200.

Accordingly, it is possible to adjust at least one of the first variable distance "A" and the second variable distance "B" such that the sum of the first variable distance "A" and the second variable distance "B" becomes longer than the reference distance "C" in order to set the degree of tilting of the head support panel 300 according to the movement distance of the movable bracket 200. For example, as shown in FIG. 2, it may be possible to convert the lower movement component due to rotation of the link 400 into a forward movement component of the head support panel 300 by forming the slide slot 311 along a lower-rear orthogonal line and it may be possible to set the degree of change of the second variable distance "B" according to the movement distance of the movable bracket 200 by setting the position of the coupling protrusion 410 between both ends of the link 400. The closer the coupling protrusion becomes to the other end of the link 400, the more the second variable distance "B" according to the movement distance of the movable bracket 200 would increase.

The link 400 may be provided in pairs at both ends of the base 100, respectively, the panel protrusion 310 may also be provided in pairs at both sides of the rear side of the head support panel 300, and the guide slot 210 may also be provided at both ends of the movable bracket 200. According to this configuration, a pair of links 400 respectively supports both ends of the base 100 and the head support panel 300 and prevents the movable bracket 200 from being rotated to the rotation direction of the lead screw 110 with the lead screw when the lead screw 110 rotates, so it is possible to accurately control the forward/backward movement of the movable bracket 200.

According to the headrest reclining module having the structure described above, forward/backward movement and reclining are simultaneously made, so reclining is possible within a larger range.

Further, the head support panel 300 is tilted with movement of the movable bracket 200, so there is no need to arrange a specific actuator for tilting the head support panel 300, and accordingly, it is possible to reduce the manufacturing cost and improve productivity.

Although the present disclosure was described with reference to specific embodiments shown in the drawings, it is apparent to those skilled in the art that the present disclosure may be changed and modified in various ways without departing from the scope of the present disclosure.

The invention claimed is:

1. A headrest reclining module comprising:
    a base;
    a movable bracket coupled to the base and configured to move forward and backward with respect to the base;
    a head support panel having an end coupled to the movable bracket and including a panel protrusion, the head support panel having a bisecting line at a middle of a height thereof and configured to tilt forward; and
    a link including a first end and a second end, the first and second ends respectively coupled to the base and the panel protrusion of the head support panel,
    wherein the panel protrusion includes a first portion and a second portion, and the first portion is extended backward from and perpendicular to the head support panel,
    wherein the first portion includes a first edge and a second edge, the first portion is directly connected to the head support panel at the first edge in a direction perpendicular to the head support panel, and the second portion is continuously and directly extended from the first portion in a lower and rearward direction toward the bisecting line of the head support panel,
    wherein the first end of the link is configured to slide along a predetermined path set in the second portion of the head support panel when the movable bracket is moved,
    wherein the head support panel has a lower end hinged to the movable bracket such that an upper end of the head support panel is configured to rotate and tilt around the lower end, and
    wherein a slide slot is formed in the second portion of the panel protrusion along a longitudinal direction of the second portion and configured to define the predetermined path along which the first end of the link slides.

2. The headrest reclining module of claim 1, further comprising: a lead screw disposed on the base, protruding forward from the base, and thread-fastened to the movable bracket; and
    an actuator configured to rotate the lead screw and to move the movable bracket forward and backward with respect to the base.

3. The headrest reclining module of claim 1, wherein the panel protrusion is formed at the upper end of the head support panel.

4. The headrest reclining module of claim 3, wherein the second end of the link is rotatably hinged to the lower end of the base.

5. The headrest reclining module of claim 1, wherein a coupling protrusion is formed between the first and second ends of the link to be coupled to the movable bracket, and a guide slot is longitudinally formed in the movable bracket and configured to guide the coupling protrusion sliding therein.

6. The headrest reclining module of claim 1, wherein a coupling protrusion is formed between the first and second ends of the link, and a position of the coupling protrusion on the link is determined at a point where a sum of a first variable distance and a second variable distance is equal to or greater than a horizontal distance from the coupling protrusion to a rear side of the head support panel, and
    wherein the first variable distance is a horizontal distance from a rear side of the head support panel to a joint point between the first end of the link and the slide slot, and the second variable distance is a horizontal distance from the coupling protrusion to the joint point between the first end of the link and the slide slot.

* * * * *